United States Patent
Sato

(10) Patent No.: US 7,607,416 B2
(45) Date of Patent: Oct. 27, 2009

(54) ENGINE CONTROL DEVICE

(75) Inventor: Syouichi Sato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/076,764

(22) Filed: Mar. 21, 2008

(65) Prior Publication Data

US 2008/0283025 A1    Nov. 20, 2008

(30) Foreign Application Priority Data

Mar. 23, 2007    (JP)    ............... 2007-077628

(51) Int. Cl.
*F02P 5/152*    (2006.01)
(52) U.S. Cl. ............... 123/406.24; 123/406.45; 123/90.15
(58) Field of Classification Search ........... 123/406.24, 123/406.29, 406.45, 90.15–90.18
See application file for complete search history.

(56) References Cited

U.S. PATENT DOCUMENTS

| | | | | |
|---|---|---|---|---|
| 5,660,157 A | * | 8/1997 | Minowa et al. | ............. 123/344 |
| 5,884,605 A | * | 3/1999 | Nagaishi et al. | ........ 123/339.11 |
| 6,425,371 B2 | * | 7/2002 | Majima | ................. 123/406.24 |
| 6,993,427 B2 | * | 1/2006 | Ueda | .......................... 701/111 |
| 7,331,317 B2 | | 2/2008 | Yasui et al. | |
| 2001/0002591 A1 | * | 6/2001 | Majima | ................. 123/406.24 |
| 2004/0237917 A1 | | 12/2004 | Yasui et al. | |
| 2005/0000492 A1 | * | 1/2005 | Nakai et al. | ............ 123/406.45 |

FOREIGN PATENT DOCUMENTS

| | | |
|---|---|---|
| JP | 61-187528 | 8/1986 |
| JP | 61-190147 | 8/1986 |
| JP | 06-330776 | 11/1994 |
| JP | 2004-360552 | 12/2004 |

* cited by examiner

*Primary Examiner*—Erick Solis
(74) *Attorney, Agent, or Firm*—Smith, Gambrell & Russell, LLP

(57) ABSTRACT

To improve power performance while avoiding or suppressing surging, an engine control device comprises a VVT mechanism for varying the open/close timing of an intake valve, and the occurrence of surging is determined by comparing an engine rotation variation width with a surge determination threshold. When it is determined that surging has occurred, an ignition timing surge correction amount is set at a value that has been corrected in an advancement direction, and the ignition timing is corrected in the advancement direction by the ignition timing surge correction amount. Further, a VVT surge correction amount by which the open/close timing of the intake valve is corrected using the intake VVT mechanism is set at a value that has been corrected in a retardation direction, and a control current value for operating the intake VVT mechanism is corrected in the retardation direction by the VVT surge correction amount.

4 Claims, 12 Drawing Sheets

US 7,607,416 B2

ENGINE CONTROL DEVICE

CROSS REFERENCES TO RELATED APPLICATIONS

The disclosure of Japanese Patent Application No. 2007-077628 filed on Mar. 23, 2007 including the specifications, drawings, and abstracts are incorporated by references.

BACKGROUND OF THE INVENTION

1. Field of the Invention

The present invention relates to a control device for an engine that avoids or suppresses the occurrence of surging by retarding an open/close timing of an intake valve using a variable valve timing mechanism and advancing an ignition timing when surging is determined to have occurred.

2. Description of the Related Art

In a conventional engine installed with a supercharger such as an exhaust turbo-supercharger or a mechanical supercharger, a knocking limit decreases when a boost pressure is increased, thereby increasing the likelihood of knocking. To avoid a decrease in the knocking limit, control is performed to retard the ignition timing, but as retardation of the ignition timing progresses, a delay occurs in combustion ignition, leading to a decrease in the peak value of an internal cylinder pressure in comparison with ignition at the normal ignition timing, and as a result, the timing of the internal cylinder pressure peak is delayed. These phenomena occur during each combustion cycle such that variation in the peak value of the internal cylinder pressure and the timing of the internal cylinder pressure peak increases between each cylinder.

This variation in combustion between each cylinder leads to torque variation, and as a result of this torque variation, surging occurs. To avoid surging, means such as the following may be considered.

(1) Advancing the ignition timing by reducing the actual compression ratio (actual compression pressure).
(2) Reducing the set boost pressure.
(3) Advancing the ignition timing by enriching the air-fuel ratio.
(4) Increasing the combustion speed to raise the knocking limit.

Of these means, realizing (4) requires design modifications to the engine itself, and therefore (4) is not feasible. As a result of (1) and (3), the fuel economy deteriorates. With (2), the power performance, including the engine response, deteriorates.

In an engine with a supercharger comprising a variable valve timing (VVT) mechanism for varying the open/close timing of at least one of an intake valve and an exhaust value, a technique for avoiding knocking by controlling the intake timing has been proposed, as disclosed in Japanese Unexamined Patent Application Publication S61-187528, Japanese Unexamined Patent Application Publication S61-190147, Japanese Unexamined Patent Application Publication H6-330776 and Japanese Unexamined Patent Application Publication 2004-360552, for example.

Japanese Unexamined Patent Application Publication S61-187528 discloses a technique of avoiding knocking by setting an intake retardation amount in accordance with a map of the engine rotation speed and the boost pressure, and adjusting the retardation amount of the opening timing of the intake valve in each cylinder.

Japanese Unexamined Patent Application Publication S61-190147 discloses a technique of avoiding knocking by retarding the intake timing when the supercharger is operative and advancing the intake timing when the supercharger is halted. Japanese Unexamined Patent Application Publication H6-330776 discloses a technique of suppressing knocking by retarding the intake timing when the engine rotation speed is in a low speed region or a high speed region and advancing the intake timing when the engine rotation speed is in a medium speed region. Japanese Unexamined Patent Application Publication 2004-360552 discloses a technique of suppressing knocking by controlling the intake timing such that in a high load region, an effective compression volume increases as the load increases.

In all of the techniques disclosed in the patent publications described above, knocking is suppressed by retarding the open/close timing of the intake valve when knocking occurs. However, none of the publications consider measures to be taken when surging occurs.

FIG. 12 shows a relationship between an engine rotation speed Ne and a target boost pressure when a throttle valve is fully open. The reference symbol Pi denotes an intercept point, and in a higher engine rotation speed region than this region, increases in the boost pressure are restricted. Surging occurs easily in a transition period during which the boost pressure increases, and a region indicating by shading, which is surrounded by a surging limit line indicated by a broken line and a transition target boost pressure indicated by a solid line, serves as a surge region. Particularly large surging occurs in the vicinity of the intercept point Pi.

To improve the power performance and boost pressure response, the open/close timing of the intake valve is preferably advanced (the intake valve is closed at an earlier timing) even when the boost pressure is in the surge region, enabling an improvement in volumetric efficiency and an increase in torque. In this region, however, surging is likely to occur, and therefore, in actuality, the occurrence of surging is suppressed by reducing the boost pressure and in certain cases enriching the air-fuel ratio.

As a result, the power performance and the boost pressure response decrease. Furthermore, when the air-fuel ratio is enriched excessively, the original potential of the engine cannot be exhibited sufficiently, and the fuel economy deteriorates.

SUMMARY OF THE INVENTION

The present invention has been designed in consideration of the circumstances described above, and it is an object thereof to provide a control device for an engine which can achieve improvements in power performance and supercharging response while avoiding or suppressing surging, and also achieve an improvement in fuel economy.

A first invention for achieving this object is a control device for an engine having a variable valve timing mechanism that varies an open/close timing of an intake valve includes surge determining means for determining the occurrence of surging on the basis of a parameter indicating a combustion variable of the engine, ignition timing control means for setting an ignition timing on the basis of an engine operating condition, and ignition timing and open/close timing correcting means for correcting the open/close timing of the intake valve in a retardation direction using the variable valve timing mechanism and correcting the ignition timing in an advancement direction using the ignition timing control means when the surge determining means determine that surging has occurred.

A second invention is a control device for an engine having a variable valve timing mechanism that varies an open/close timing of an intake valve, and a supercharger includes ignition timing control means for setting an ignition timing on the basis of an engine operating condition, surge region determining means for determining whether or not a boost pressure of the supercharger is within a preset surge region, and ignition timing and open/close timing correcting means for correcting the open/close timing of the intake valve in a retardation direction using the variable valve timing mechanism and correcting the ignition timing in an advancement direction using the ignition timing control means when the surge region determining means determine that the boost pressure is within the surge region.

According to the present invention, when surging is determined to have occurred or the boost pressure is determined to be within the surge region, the open/close timing of the intake valve is corrected in the retardation direction by the variable valve timing mechanism and the ignition timing is corrected in the advancement direction, and therefore the power performance can be improved while avoiding or suppressing surging. Further, when a supercharger is provided, the supercharging response can also be improved. Furthermore, since surging can be avoided or suppressed without enriching the air-fuel ratio, an improvement in fuel economy can be achieved.

DESCRIPTION OF THE PREFERRED EMBODIMENT

Figure 1:
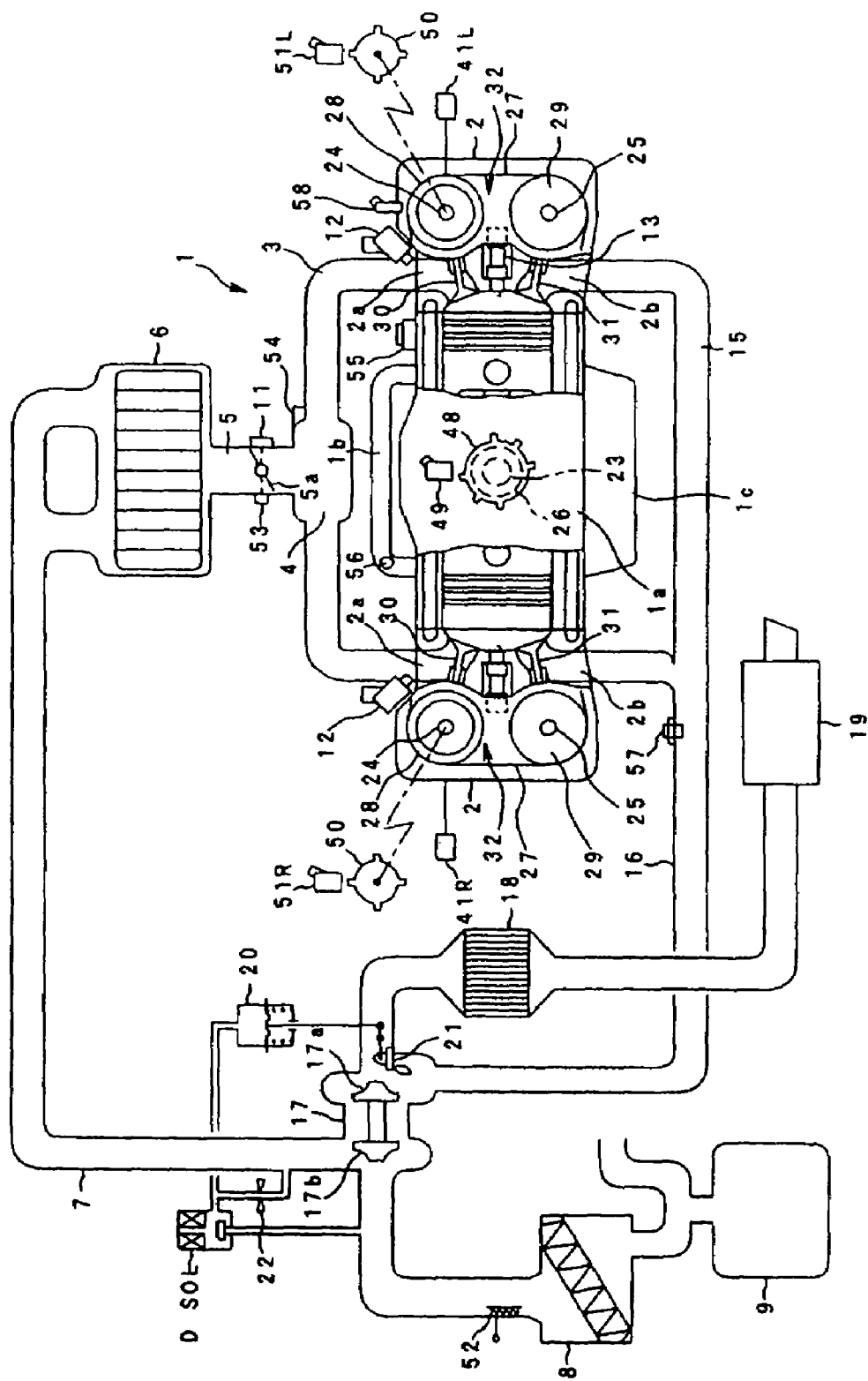
FIG. 1 is an overall constitutional diagram of an engine having a variable valve timing mechanism.

An embodiment of the present invention will be described below on the basis of FIGS. 1 to 11. FIG. 1 is an overall constitutional diagram of an engine having a variable valve timing mechanism.

The reference numeral 1 in FIG. 1 denotes an engine main body. The drawing shows a DOHC horizontally opposed four-cylinder gasoline engine. A cylinder head 2 is provided in each of left and right banks of a cylinder block 1a of the engine 1, and each cylinder head 2 is formed with an intake port 2a and an exhaust port 2b communicating with the cylinders.

As an intake system of the engine 1, an intake manifold 3 communicates with each intake port 2a in a bifurcating manner, and an upstream convergence portion of each intake manifold 3 communicates with an air chamber 4. A throttle chamber 5 in which a throttle valve 5a is interposed communicates with an upstream side of the air chamber 4. The throttle valve 5a is provided alongside a throttle actuator 11 to constitute an electronic throttle control device (ETC) that is operated to open and close on the basis of a drive signal from an electronic control unit (ECU) 60 to be described below.

Further, an intercooler 6 is interposed upstream of the throttle chamber 5, and an intake pipe 7 communicates with the upstream side of the intercooler 6. An air cleaner 8 is interposed on the upstream side of the intake pipe 7. Further, a compressor 17b of an exhaust turbo-supercharger 17 serving as an example of a supercharger is interposed at a point on the intake pipe 7. Further, an air intake chamber 9 communicates with the upstream side of the air cleaner 8.

An injector 12 is disposed in the intake manifold 3 directly upstream of the intake port 2a of each cylinder, and a spark plug 13 is provided for each cylinder of the cylinder head 2. Note that the spark plug 13 is connected to a secondary winding side of an ignition coil 14 having a built-in igniter (see FIG. 2).

Meanwhile, as an exhaust system of the engine 1, exhaust gas is converged by an exhaust manifold 15 communicating with each exhaust port 2b of the cylinder head 2, and an exhaust pipe 16 communicates with a convergence portion of the exhaust manifold 15. A turbine 17a of the exhaust turbo-supercharger 17 is interposed in the exhaust pipe 16, while a catalyst 18 and a muffler 19 are disposed downstream thereof and opened to the atmosphere. The exhaust turbo-supercharger 17 aspirates, pressurizes and supercharges air when the compressor 17b is driven to rotate by the energy of the exhaust gas that is introduced into the turbine 17a, and a wastegate valve 21 comprising a wastegate valve-activating actuator 20 constituted by a diaphragm-type actuator is provided on the turbine 17a side.

The wastegate valve-activating actuator 20 is partitioned into two chambers by a diaphragm. One of the chambers forms a pressure chamber communicating with a boost pressure control duty solenoid valve D.SOL, and the other forms a spring chamber that houses a spring for biasing the wastegate valve 21 in a closing direction and has a rod extending therethrough so as to connect the diaphragm and the wastegate valve 21. The spring chamber is open to the atmosphere.

The boost pressure control duty solenoid valve D.SOL is an electromagnetic two-way valve having a port that communicates with the pressure chamber of the wastegate valve-activating actuator 20 and the intake pipe 7 downstream of the compressor 17b of the exhaust turbo-supercharger 17 via an orifice 22, and a port that communicates with the intake valve 7 upstream of the compressor 17b. The valve opening of the port that communicates with the intake pipe 7 upstream of the compressor 17b is adjusted in accordance with the duty ratio of a control signal output from the electronic control unit 60 to be described below (see FIG. 2). The upstream side pressure and downstream side pressure of the compressor 17b are adjusted in accordance with the valve opening of this port such that a control pressure is supplied to the pressure chamber of the wastegate valve-activating actuator 20. As a result, the opening of the wastegate valve 21 is adjusted, whereby the boost pressure is controlled.

Meanwhile, an intake camshaft 24 and an exhaust camshaft 25 are disposed respectively within the respective cylinder heads 2 of the left and right banks, and the rotation of a crankshaft 23 is transmitted to the respective intake camshafts 24 and exhaust cam shafts 25 via a crank pulley 26 fixed to the crankshaft 23, a timing belt 27, an intake cam pulley 28 interposed in the intake camshaft 24, an exhaust cam pulley 29 fixed to the exhaust camshaft 25 and so on. An intake valve 30 and an exhaust valve 31 are driven to open and close on the basis of the rotation of the respective camshafts 24, 25, which are maintained at a rotation angle of 2:1 relative to the crankshaft 23 by means of an intake cam (not shown) provided on the intake camshaft 24 and an exhaust cam (not shown) provided on the exhaust camshaft 25.

A hydraulically driven variable valve timing mechanism 32 that continuously modifies the rotary phase (displacement angle) of the intake camshaft 24 relative to the crankshaft 23 by rotating the intake cam pulley 28 relative to the intake camshaft 24 is provided between the intake camshaft 24 and intake cam pulley 28 provided in each of the left and right banks. By means of the variable valve timing mechanism 32, the open/close timing of the intake valve 30 is set variably in accordance with engine operating conditions. Note that hereafter, the variable valve timing mechanism 32 provided on the intake side will be referred to as the intake VVT mechanism 32 for convenience. The variable valve timing mechanism may also be interposed between the respective exhaust camshafts 25 and exhaust cam pulleys 29.

The intake VVT mechanism 32 provided in each bank is also provided with oil flow control valves 41R, 41L. The oil flow control valves 41R, 41L adjust the pressure of working oil having oil that is supplied via an oil pump (not shown) and stored in an oil pan as an oil pressure source, and are operationally controlled by drive signals from the electronic control unit (ECU) 60 to be described below.

The oil flow control valves 41R, 41L are spool valves that are subjected to duty control or linear control by the ECU 60, for example. The spool of the oil flow control valves 41R, 41L moves axially in proportion with an electrification current, thereby switching ports that communicate respectively with an advancement chamber (a hydraulic chamber of an advancement operation) and a retardation chamber (a hydraulic chamber of a retardation operation) of the intake VVT mechanism 32 so as to switch the flow direction of the oil. By adjusting the opening of a passage to adjust the magnitude of the oil pressure that is supplied to the advancement chamber and retardation chamber of the intake VVT mechanism 32 at the same time, the open/close timing of the intake valve 30 is advanced or retarded by a predetermined amount. Note that a detailed description of the constitution of the intake VVT mechanism 32 can be found in Japanese Unexamined Patent Application Publication 2002-266686, filed previously by the present applicant.

Further, a crank rotor 48 is attached rotatably to the crankshaft 23. A crank angle sensor 49 for detecting projections formed at predetermined crank angle intervals on the outer periphery of the crank rotor 48 and outputting a crank pulse representing the crank angle is provided in an outer peripheral direction of the crank rotor 48. Further, a cam rotor 50 is attached rotatably to the rear end of the intake camshaft 24 provided in each bank. Cam position sensors 51R, 51L for detecting a plurality of projections formed at equal angular intervals on the outer periphery of the cam rotor 50 and outputting cam position pulses representing the cam position are provided in the outer peripheral direction of the cam rotor 50.

The crank pulse detected by the crank angle sensor 49 and cam position pulses detected respectively by the cam position sensors 51R, 51L are input into the ECU 60. The ECU 60 calculates a displacement angle (actual valve timing) of the intake cam position relative to a reference crank angle on the basis of the input crank pulse and cam position pulses, and feedback-controls the intake VVT mechanism 32 such that the actual valve timing converges with a target valve timing set on the basis of the engine operating conditions.

Next, a variety of sensors for detecting the engine operating conditions will be described. An intake air amount sensor 52 for detecting an intake air amount from the mass flow rate of the intake air that flows through the intake pipe 7 is disposed immediately downstream of the air cleaner 8 in the intake pipe 7 so as to face the air cleaner 8. A throttle opening sensor 53 for detecting a throttle opening is disposed alongside the throttle valve 5a. Further, an intake pipe pressure sensor 54 for detecting the intake pipe pressure downstream of the throttle valve 5a as an absolute pressure is disposed facing the air chamber 4. Further, a knocking sensor 55 serving as knocking detecting means is attached to the cylinder block 1a of the engine 1, and a cooling water temperature sensor 56 is disposed so as to face a cooling water passage 1b that communicates with the left and right banks of the cylinder block 1a.

Further, an air-fuel ratio sensor 57 for detecting the air-fuel ratio of the exhaust gas is provided so as to face the convergence portion of the exhaust manifold 15 communicating with each cylinder. Further, a cylinder determination sensor 58 opposes a rear surface of the intake cam pulley 28 provided in one of the banks. A cylinder determining projection (not shown) is formed in a position corresponding to compression top dead center of each cylinder on the outer peripheral side of the rear surface of the intake cam pulley 28 opposite the cylinder determination sensor 58, and the ignition subject cylinder is determined by detecting this projection using the cylinder determination sensor 58. When the intake VVT mechanism 32 is operated, the open/close timing of the intake valve 30 is advanced or retarded by a predetermined amount using compression top dead center of each cylinder as a reference.

The ECU 60 calculates the engine rotation speed Ne on the basis of an input interval of the crank pulse detected by the crank angle sensor 49, and determines cylinders such as the ignition subject cylinder on the basis of the combustion stroke order of the cylinders (for example, cylinder #1→cylinder #3→cylinder #2→cylinder #4) and a cylinder determination pulse detected by the cylinder determination sensor 58. The ECU 60 also calculates the actual displacement angle (actual valve timing) of the intake cam position relative to the reference crank angle on the basis of the crank pulse detected by the crank angle sensor 49 and the cam position pulses detected by the cam position sensors 51R, 51L.

The ECU 60 calculates a control amount for each of various actuators by processing signals from these various sensors and switches, and then performs fuel injection control, ignition timing control, boost pressure control, valve timing control relating to the intake valve 30, and so on.

Figure 2:
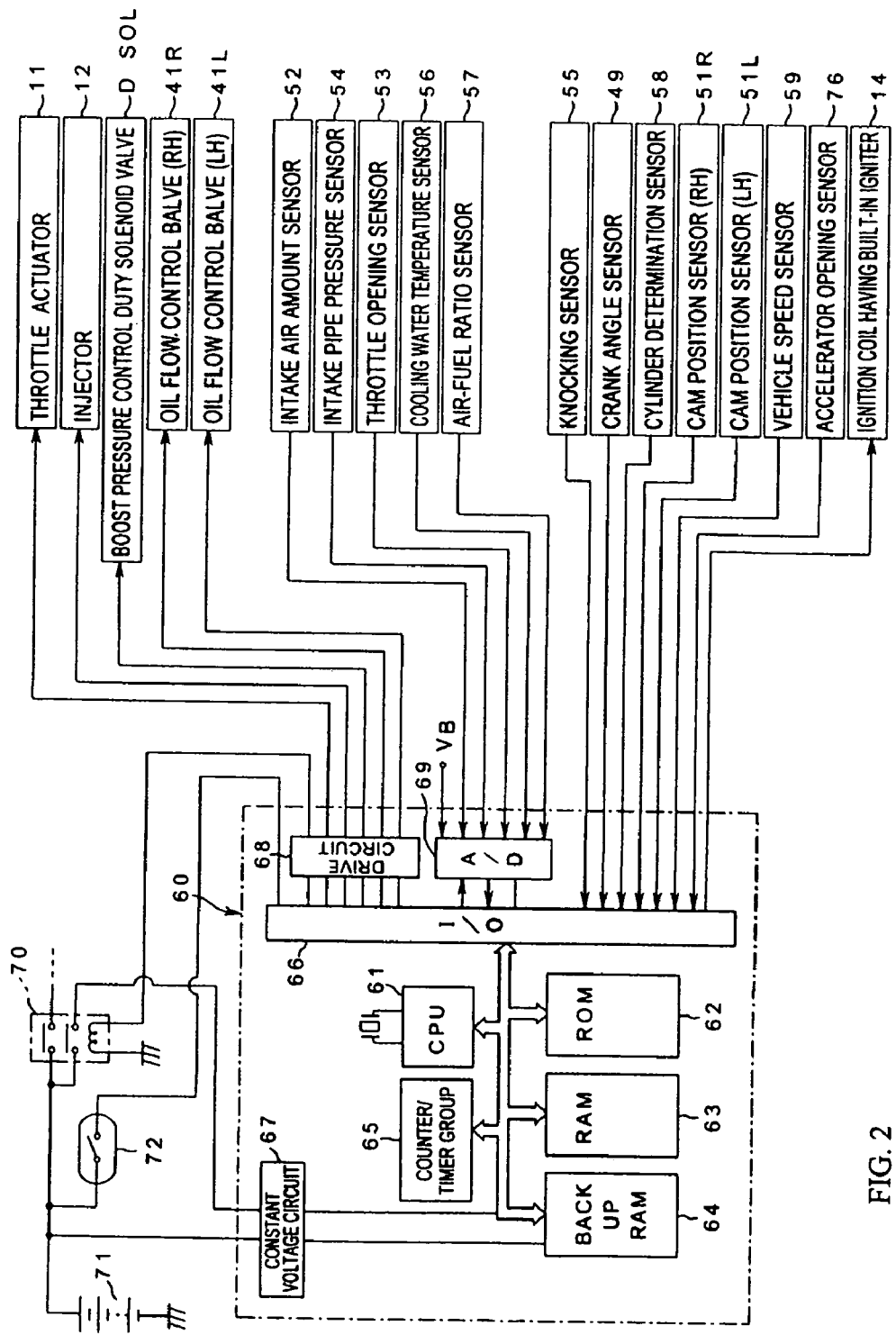
FIG. 2 is a circuit diagram of an electronic control system.

As shown in FIG. 2, the ECU 60 is formed around a microcomputer in which a CPU 61, ROM 62, RAM 63, backup RAM 64, a counter/timer group 65 and an I/O interface 66 are connected via a bus line, and is installed with peripheral circuits such as a constant voltage circuit 67 for supplying a stabilized power supply to each portion, a drive circuit 68 connected to the I/O interface 66, and an A/D converter 69. Note that various types of software counters and timers are used as the counter/timer group 65.

The constant voltage circuit 67 is connected to a battery 71 via a first relay contact of a power supply relay 70. In the power supply relay 70, one end of a relay coil thereof is grounded, and the other end of the relay coil is connected to the drive circuit 68. Note that a power wire for supplying power to the various actuators from the battery 71 is connected to a second relay contact of the power supply relay 70. Further, one end of an ignition switch 72 is connected to the battery 71, and the other end of the ignition switch 72 is connected to an input port of the I/O interface 66. The constant voltage circuit 67 is connected directly to the battery 71 such that when the ignition switch 72 is detected to be ON and the contacts of the power supply relay 70 are closed, power is supplied to each internal portion of the ECU 60. Meanwhile, backup power is supplied to the backup RAM 64 constantly, regardless of whether the ignition switch 72 is ON or OFF.

Further, the knocking sensor 55, crank angle sensor 49, cylinder determination sensor 58, cam position sensors 51R, 51L, a vehicle speed sensor 59 for detecting the vehicle speed, an accelerator opening sensor 76 for detecting the accelerator opening, and so on are connected to the input port of the I/O interface 66, while the intake air amount sensor 52, throttle opening sensor 53, intake pipe pressure sensor 54, cooling water temperature sensor 56, air-fuel ratio sensor 57 and so on are connected to the input port of the I/O interface 66 via the A/D converter 69. A battery voltage VB is also input into the input port of the I/O interface 66 and monitored thereby. Meanwhile, the throttle actuator 11, injector 12, boost pressure control duty solenoid valve D.SOL, oil flow control valves 41R, 41L and the relay coil of the power supply relay 70 are connected to an output port of the I/O interface 66 via the drive circuit 68, and the ignition coil 14 having a built-in igniter is also connected thereto.

The CPU 61 processes detection signals from the sensors and switches, which are input via the I/O interface 66, as well as the battery voltage and so on in accordance with a control program stored in the ROM 62, calculates control amounts relating to the injector 12, the ignition coil 14 having a built-in igniter, the throttle actuator 11, the boost pressure control duty solenoid valve D.SOL, the oil flow control valves 41R, 41L etc. on the basis of various data stored in the RAM 63, various learned value data stored in the backup RAM 64, fixed data stored in the ROM 62 and so on, and then performs fuel injection control, ignition timing control, throttle opening control, boost pressure control, valve timing control and other types of engine control.

In ignition timing control, a basic ignition timing is set on the basis of the engine rotation speed Ne and an engine load Lo determined on the basis of a basic fuel injection amount, which is calculated during fuel injection control, and so on. The basic ignition timing is then corrected by a correction amount set on the basis of the engine operating conditions to calculate a final ignition timing, and the final ignition timing is output at a predetermined timing. When knocking occurs, the knocking is suppressed by retarding the ignition timing by a predetermined amount.

In boost pressure control, a target boost pressure is set on the basis of the engine rotation speed Ne and a throttle opening θth, and the opening of the boost pressure control duty solenoid valve D.SOL is controlled such that the intake pipe pressure (actual boost pressure), which is detected by the intake pipe pressure sensor 54 serving as boost pressure detecting means, converges with the target boost pressure. By adjusting the control pressure that is introduced into the pressure chamber of the wastegate valve-activating actuator 20 in this manner, the boost pressure is controlled.

In valve timing control, a target valve timing VTTGT is set on the basis of the engine load Lo and the engine rotation speed Ne, and the operation of the oil flow control valves 41R, 41L is controlled such that an actual valve timing VT converges with the target valve timing VTTGT. When surging occurs at this time, integrated control is performed on the open/close timing of the intake valve 30 by the intake VVT mechanism 32 through valve timing control and also on the ignition timing, and thus the surging is suppressed.

The ignition timing control and valve timing control that are executed by the ECU 60 are processed specifically as shown in the flowcharts of FIGS. 4 to 9.

Figure 4:
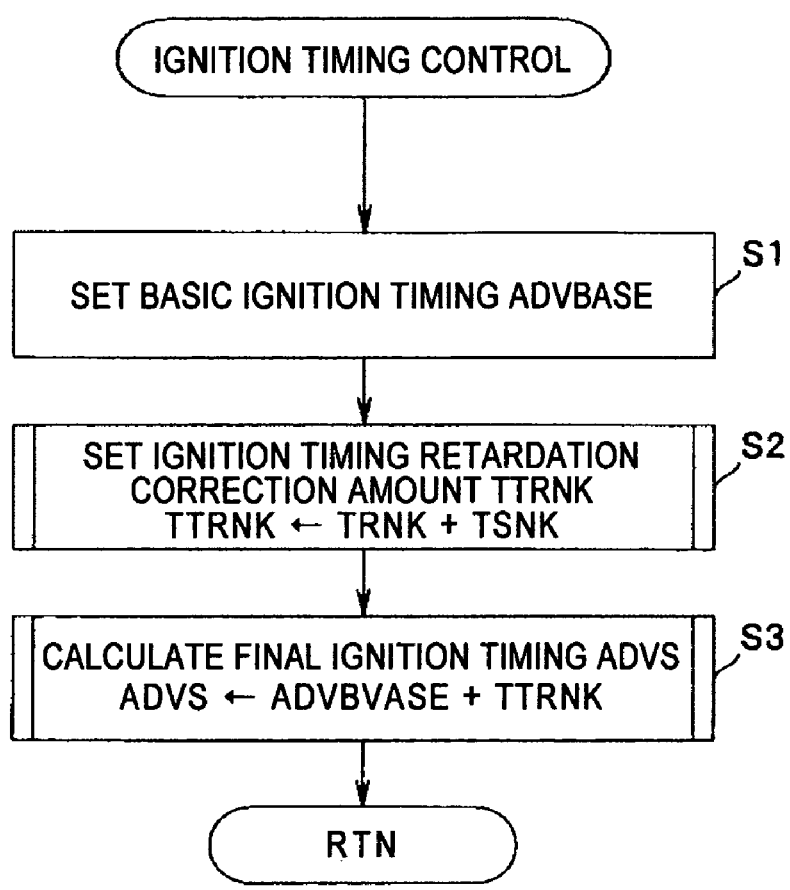
FIG. 4 is a flowchart showing an ignition timing control routine.

FIG. 4 shows an ignition timing control routine. Note that the processing executed in this routine corresponds to ignition timing control means. This routine is executed at set calculation cycle intervals after the ignition switch 72 has been switched ON, and first, in a step S1, a basic ignition timing ADVBASE is calculated. The basic ignition timing ADVBASE is calculated by referencing a basic ignition timing map (not shown) through an interpolation calculation on the basis of the engine rotation speed Ne and engine load Lo, and is advanced as the engine rotation speed Ne increases and set in a retardation direction as the engine load Lo increases. Note that in this embodiment, a basic fuel injection amount Tp set on the basis of an intake air amount Q and the engine rotation speed Ne is employed as the engine load Lo, but the throttle opening θth may be employed as the engine load Lo.

The routine then advances to a step S2, where an ignition timing retardation correction amount TTRNK is set from the following Equation (1).

$$TTRNK \leftarrow TRNK + TSNK \qquad (1)$$

where TRNK is a knocking retardation correction amount and TSNK is an ignition timing surge correction amount.

Figure 5:
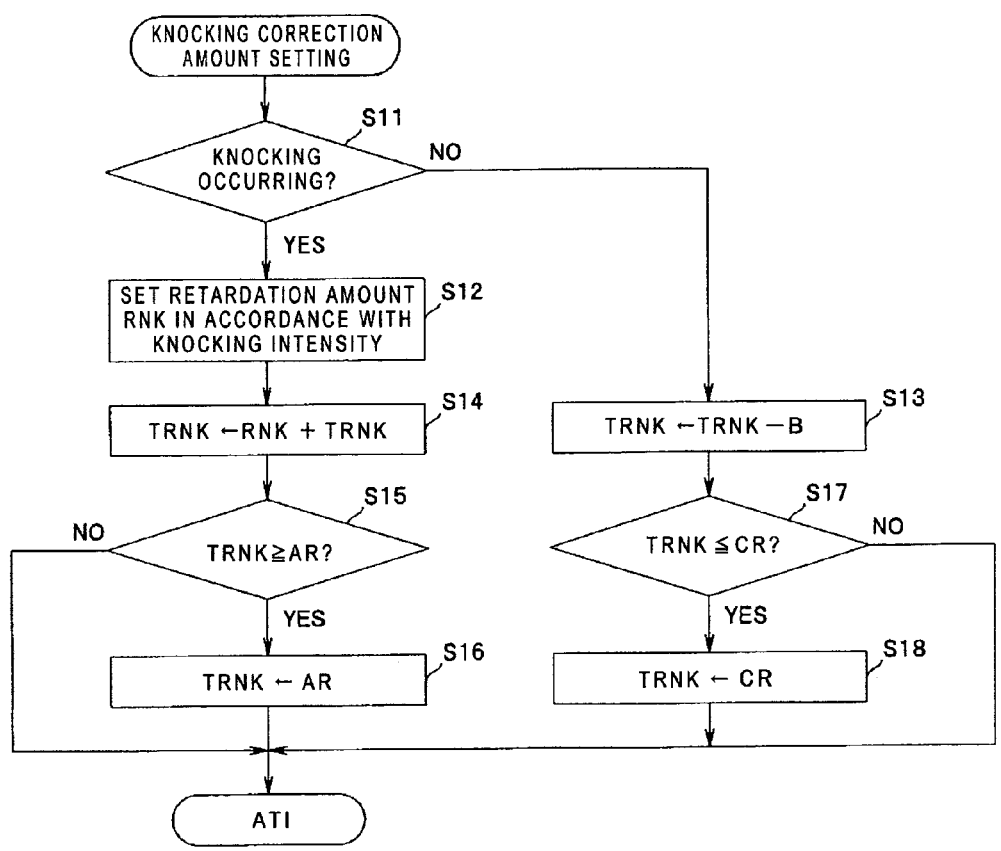
FIG. 5 is a flowchart showing a knocking correction amount setting routine.

The knocking correction amount TRNK is a correction amount for correcting the ignition timing in the retardation direction when knocking occurs, and is set in a knocking correction amount setting routine shown in FIG. 5. The ignition timing surge correction amount TSNK is a correction amount for correcting the ignition timing in the advancement direction when surging occurs, and is set in a pre-surge ignition timing correction amount/VVT correction amount setting routine shown in FIGS. 7 and 8 and a post-surge ignition timing correction amount/VVT correction amount setting routine shown in FIG. 9. The processing executed in these routines will be described later.

Next, when the routine advances to a step S3, the ignition timing retardation correction amount TTRNK is added to the basic ignition timing ADVBASE to calculate a final ignition timing ADVS (ADVS←ADVBASE+TTRNK), whereupon the routine is exited. Note that in actuality, the final ignition timing ADVS is set by subjecting the basic ignition timing ADVBASE not only to feedback correction using the ignition timing retardation correction amount TTRNK, which is set on the basis of knocking and surging as described above, but also to feed-forward correction using a water temperature correction amount or the like, which is set on the basis of the cooling water temperature detected by the cooling water temperature sensor 56, and various other correction items.

Figure 10:
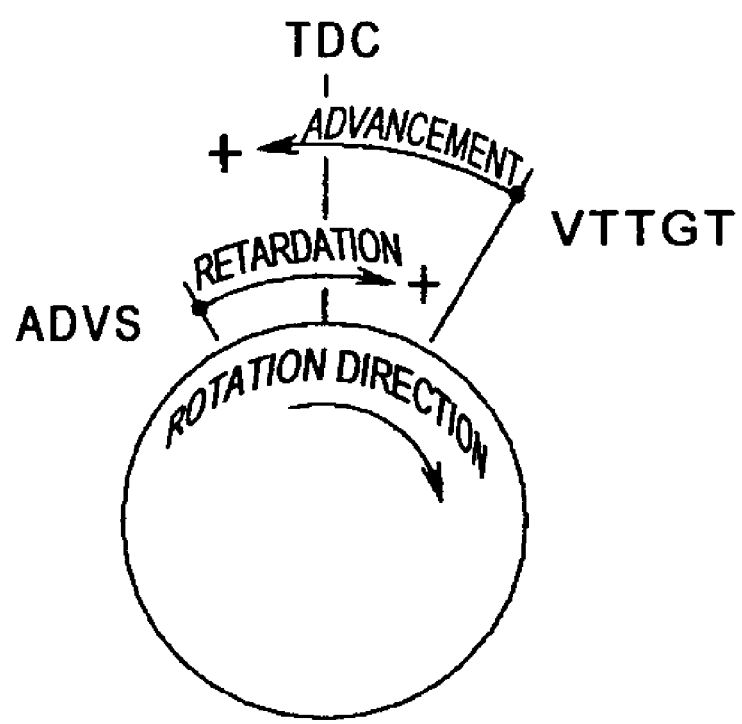
FIG. 10 is an illustrative view showing a retardation direction of the ignition timing and an advancement direction of a target value timing set by the intake VVT mechanism.

The final ignition timing ADVS is set in a predetermined register, and at the timing thereof, an ignition signal is output to the ignition coil 14 having a built-in igniter of the ignition subject cylinder, whereby an ignition spark is generated from the spark plug facing the combustion chamber of each cylinder so as to ignite the air-fuel mixture filling the combustion chamber. As shown in FIG. 10, in the ignition timing control of this embodiment, the reference crank angle is set in a predetermined advancement direction, and the ignition timing is set with a reference crank angle of 0 [° CA (crank angle)]. Accordingly, the ignition timing is corrected in the retardation direction as the ignition timing retardation correction amount TTRNK increases.

Next, the processing executed in the knocking correction amount setting routine shown in FIG. 5 will be described. In this routine, the knocking correction amount TRNK read in the step S2 of the ignition timing control routine described above is set.

First, in a step S11, the presence of knocking is detected on the basis of an output signal from the knocking sensor 55. The determination as to whether or not knocking has occurred is made by comparing a knocking intensity, which is obtained by subjecting an oscillation waveform output from the knocking sensor 55 to statistical processing or the like, to a predetermined knocking determination level, for example. When the knocking intensity exceeds the knocking determination level, it is determined that knocking has occurred.

When it is determined that knocking has occurred, the routine advances to a step S12, and when it is determined that knocking has not occurred, the routine advances to a step S13.

When it is determined that knocking has occurred and the routine advances to the step S12, a retardation amount RNK corresponding to the knocking intensity, which is calculated on the basis of the output signal from the knocking sensor 55, is set. The retardation amount RNK is the increment that is used when the ignition timing is retarded incrementally to suppress knocking, and is therefore set at a small value when the knocking intensity is low (when the knocking is weak) and at a steadily larger value as the knocking intensity increases (as the knocking becomes stronger). In this embodiment, the retardation amount RNK is set by searching a table using the knocking intensity as a parameter, but may be calculated from an equation based on the knocking intensity. Note that the processing of this step corresponds to surge determining means.

Next, the routine advances to a step S14, where the retardation amount RNK set in the step S12 is added to the current knocking correction amount TRNK to obtain a new knocking correction amount TRNK (TRNK←RNK+TRNK).

Next, the routine advances to a step S15, where a determination is made as to whether or not the updated knocking correction valve TRNK has reached a threshold AR. The threshold AR is a fixed value obtained in advance through simulation, experiment or the like by determining a value at which a reduction in the engine output, an increase in the exhaust gas temperature, fuel economy deterioration and so on can be suppressed to the required minimum. This value is then stored in the ROM 62 as fixed data.

When TRNK<AR, the routine is exited. When TRNK≧AR, the routine advances to a step S16, where the knocking correction amount TRNK is set at the threshold AR (TRNK←AR), after which the routine is exited. Hence, the threshold AR functions as a retardation side limiter of the knocking correction amount TRNK.

On the other hand, when it is determined that knocking has not occurred as a result of ignition timing retardation correction in the step S11, the routine advances to the step S13, where the knocking correction amount TRNK is reduced by a set value B (TRNK←TRNK−B) to return the ignition timing, which has been retarded for the purposes of knocking suppression, gradually to the advancement side. The set value B is obtained in advance through simulation, experiment or the like by determining an appropriate value at which a normal ignition timing can be returned to smoothly while avoiding shock caused by rapid advancement of the ignition timing. This value is then stored in the ROM 62 as fixed data.

The routine then advances to a step S17, where a determination is made as to whether or not the knocking correction amount TRNK is less than a set value CR. The set value CR is a value for determining that the ignition timing has returned to the ignition timing of an operating state in which knocking does not occur, and is set at 0 or close to 0. In this embodiment, CR=0, and when TRNK>CR, the routine is exited with no further processing. When TRNK≦CR, on the other hand, the routine advances to a step S18, where the knocking correction amount TRNK is set at the set value CR (TRNK←CR), after which the routine is exited. Hence, the set value CR functions as an advancement side limiter of the knocking correction amount TRNK.

Figure 6:
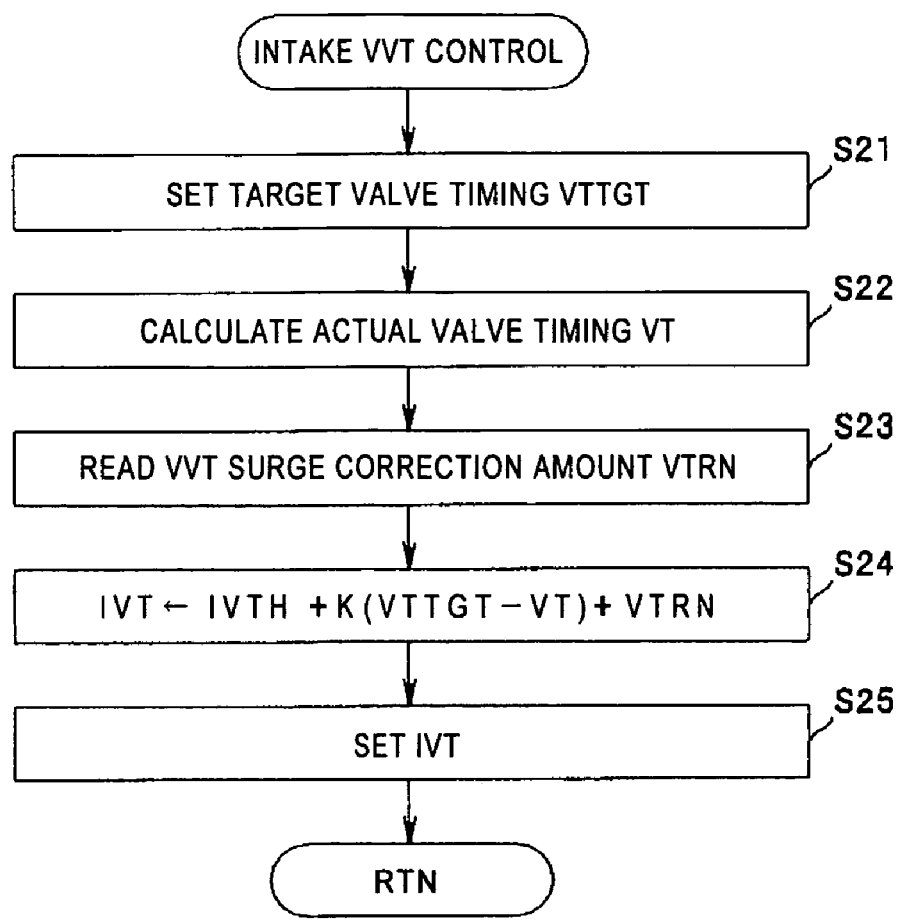
FIG. 6 is a flowchart showing an intake VVT control routine.

The intake VVT control routine shown in FIG. 6 is executed at set calculation cycle intervals after the ignition switch 72 has been switched ON. Note that the processing executed in this routine corresponds to intake variable timing valve control means.

In this routine, first, in a step S21, a target valve timing (target displacement angle) VTTGT is set by referencing a valve timing map (not shown) through an interpolation calculation on the basis of the engine load Lo (in this embodiment, the basic fuel injection amount Tp) and the engine rotation speed Ne. As shown in FIG. 10, the target valve timing VTTGT is set to advance steadily as the value thereof increases, with a maximum retardation position serving as a reference (VTTGT=0 [° CA]).

Figure 3:
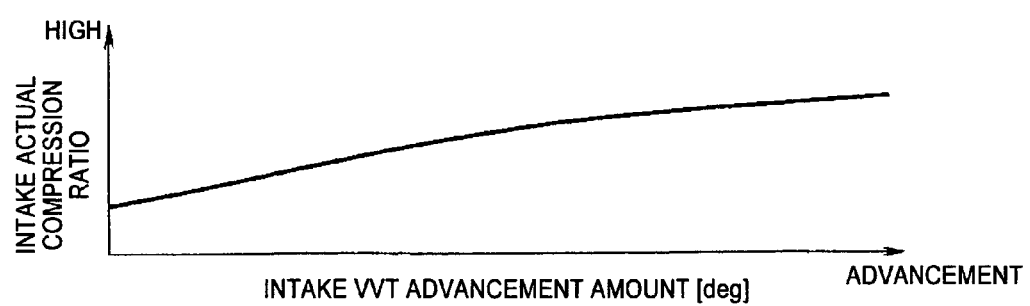
FIG. 3 is a characteristic diagram showing a relationship between an advancement amount, indicating the open/close timing of an intake VVT mechanism, and an intake actual compression ratio of a cylinder.

Further, the displacement angle is a relative rotation amount of the intake camshaft 24 relative to the crankshaft 23 and has a maximum retardation position of displacement angle=0 [° CA]. Hence, in this embodiment, "retardation" means reducing the current displacement angle. FIG. 3 shows a relationship between the retardation amount when the open/close timing of the intake VVT mechanism 32 is gradually advanced from the maximum retardation position (displacement angle=0 [° CA]) and an intake actual compression ratio (compression ratio) of the cylinder. When the engine rotation speed is constant and the open/close timing is gradually advanced from the maximum retardation position, the intake close timing becomes earlier such that compression begins earlier, and as a result, the intake actual compression ratio (compression ratio) of the cylinder increases.

In valve timing control, the open/close timing of the intake valve 30 is controlled to the maximum retardation position during a low load, low rotation idle operation, with the target valve timing VTTGT set at the maximum retardation position (VTTGT=0 [° CA]), whereupon overlap between the exhaust valve 31 and the intake valve 30 is eliminated to reduce the internal compression pressure and the volumetric efficiency of the cylinder, and thus stabilization of idling rotation is achieved. During a medium load operation, the target valve timing VTTGT is set at a small to medium advancement amount, the open/close timing of the intake valve 30 is controlled to the advancement side, the amount of overlap between the exhaust valve 31 and intake valve 30 is increased to increase an internal EGR amount (the amount of exhaust gas remaining in the cylinder) and the volumetric efficiency, and thus pumping loss in the engine is reduced, leading to an improvement in fuel economy. During a high load operation, on the other hand, the target valve timing VTTGT is set at a large advancement amount and the open/close timing of the exhaust valve 30 is controlled further toward the advancement side than in the medium load region. The amount of overlap between the exhaust valve 31 and intake valve 30 is increased further to achieve a further increase in volumetric efficiency and an increase in scavenging efficiency, and thus the engine output is improved. Furthermore, during high rotation, the open/close timing of the intake valve 30 is controlled to the advancement side with the target valve timing VTTGT set at a small advancement amount, and the intake close timing is delayed. Thus, an improvement in volumetric efficiency is achieved using inertia supercharging.

Next, when the routine advances to a step S22, the actual valve timing (actual displacement angle) VT of the intake camshaft 24 relative to the crankshaft 23 is calculated on the basis of the crank pulse output from the crank angle sensor 49 and the cam position pulse output from the cam position sensor 51R (51L). The actual valve timing has a maximum retardation position of displacement angle=0 [° CA], and increases in value with advancement.

Next, the routine advances to a step S23, where a VVT surge correction amount VTRN is read. The VVT surge correction amount VTRN is a correction amount for correcting the valve timing VVT in the retardation direction when surging occurs. The VVT surge correction amount VTRN is set in the pre-surge ignition timing correction amount/VVT correction amount setting routine shown in FIGS. 7 and 8 and the post-surge ignition timing correction amount/VVT correction amount setting routine shown in FIG. 9. Note that the processing executed in these routines will be described later.

Then, in a step S24, a control current value IVT is calculated from the following Equation (2).

$$IVT \leftarrow IVTH + K \times (VTTGT-VT) + VTRN \qquad (2)$$

where IVTH is a holding current value of the oil flow control valve 41R (41L), (VTTGT−VT) is the deviation between the target valve timing VTTGT and the actual valve timing VT, and (K×(VTTGT−VT)) is a feedback current value obtained by multiplying a proportional gain K by the aforementioned deviation.

The holding current value IVTH is a current value for holding the intake VVT mechanism 32 in a steady state converged with a predetermined target valve timing, without displacing the intake VVT mechanism 32 to either the advancement side or the retardation side. Further, the control current value IVT is a feedback current value (K×(VTTGT−VT)) corresponding to the deviation between the target valve timing VVTGT and the actual valve timing VT, with the holding current value IVTH serving as a reference, and a value that is increased and decreased by the VVT surge correction amount VTRN (for example, IVT=100 mA to 1000 mA).

Next, in a step S25, the control current value IVT is set, whereupon the routine is exited. The ECU 60 outputs a control current corresponding to the control current value IVT to the oil flow control valve 41R (41L) via the drive circuit 68.

In intake VVT control, when the VVT surge correction amount VTRN is constant and the actual valve timing VT is retarded relative to the target valve timing VTTGT (VTTGT>VT), the control current value IVT of the oil flow control valve 41R (41L) is increased such that the rotary phase of the intake camshaft 24 relative to the intake cam pulley 28, or in other words the rotary phase (displacement angle) of the intake camshaft 24 relative to the crankshaft 23, is advanced, and as a result, the open/close timing of the intake valve 30 driven by the intake cam (not shown) of the intake camshaft 24 is advanced. Conversely, when the actual valve timing VT is advanced relative to the target valve timing VTTGT (VTTGT<VT), the control current value IVT of the oil flow control valve 41R (41L) is reduced such that the rotary phase of the intake camshaft 24 relative to the intake cam pulley 28, or in other words the rotary phase (displacement angle) of the intake camshaft 24 relative to the crankshaft 23, is retarded, and as a result, the open/close timing of the intake valve 30 driven by the intake cam (not shown) of the intake camshaft 24 is retarded.

When the actual valve timing VT converges with the target valve timing VTTGT (VTTGT≅VT), the feedback current value reaches 0, whereby a spool 41g of the oil flow control valve 41R (41L) moves to a position for closing an advancement side oil passage 39 and a retardation side oil passage 40, and as a result, a vane rotor 33 of the variable valve timing mechanism 32 is stopped and held.

Figure 7:
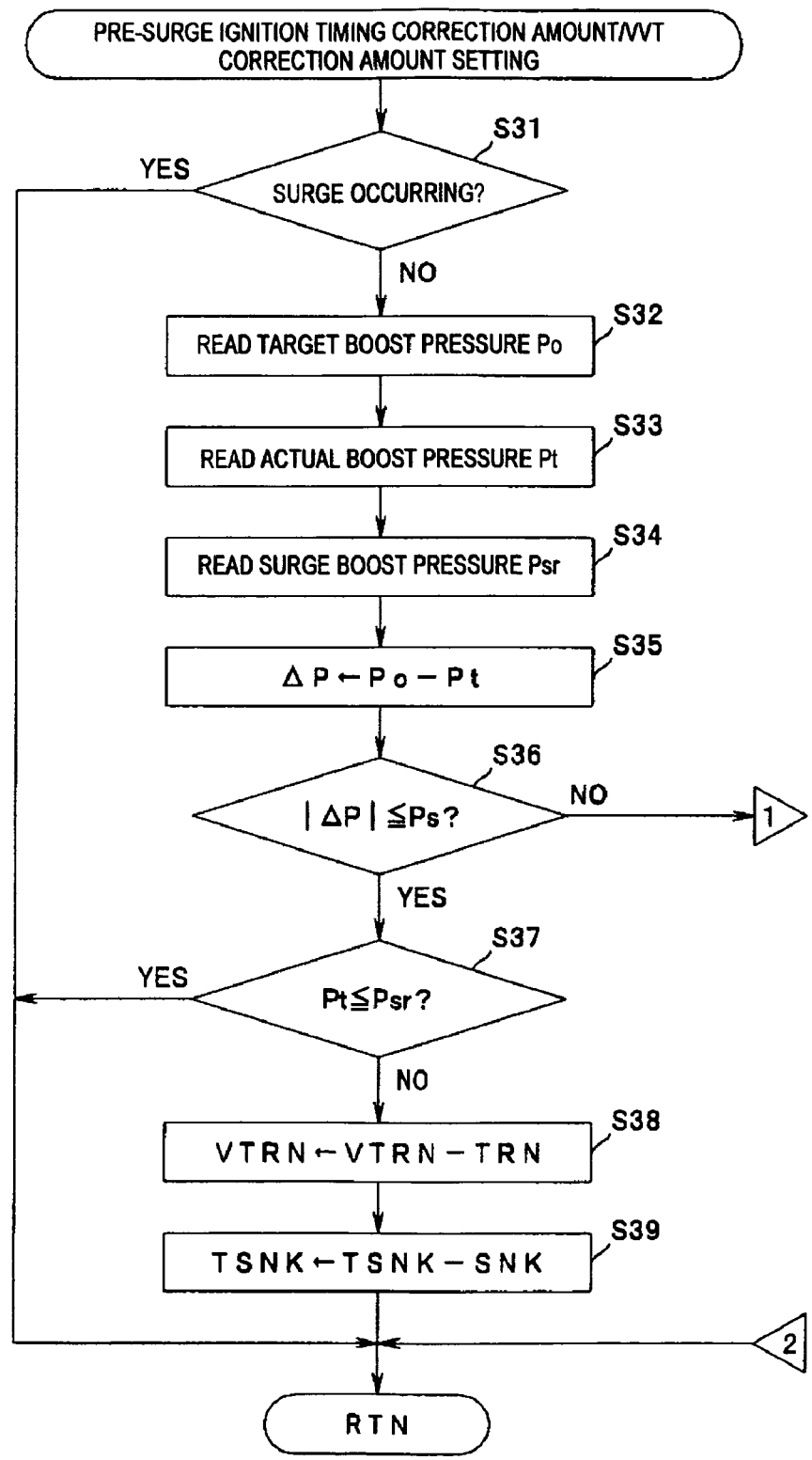
FIG. 7 is a first flowchart showing a pre-surge ignition timing correction amount/VVT correction amount setting routine.
Figure 8:
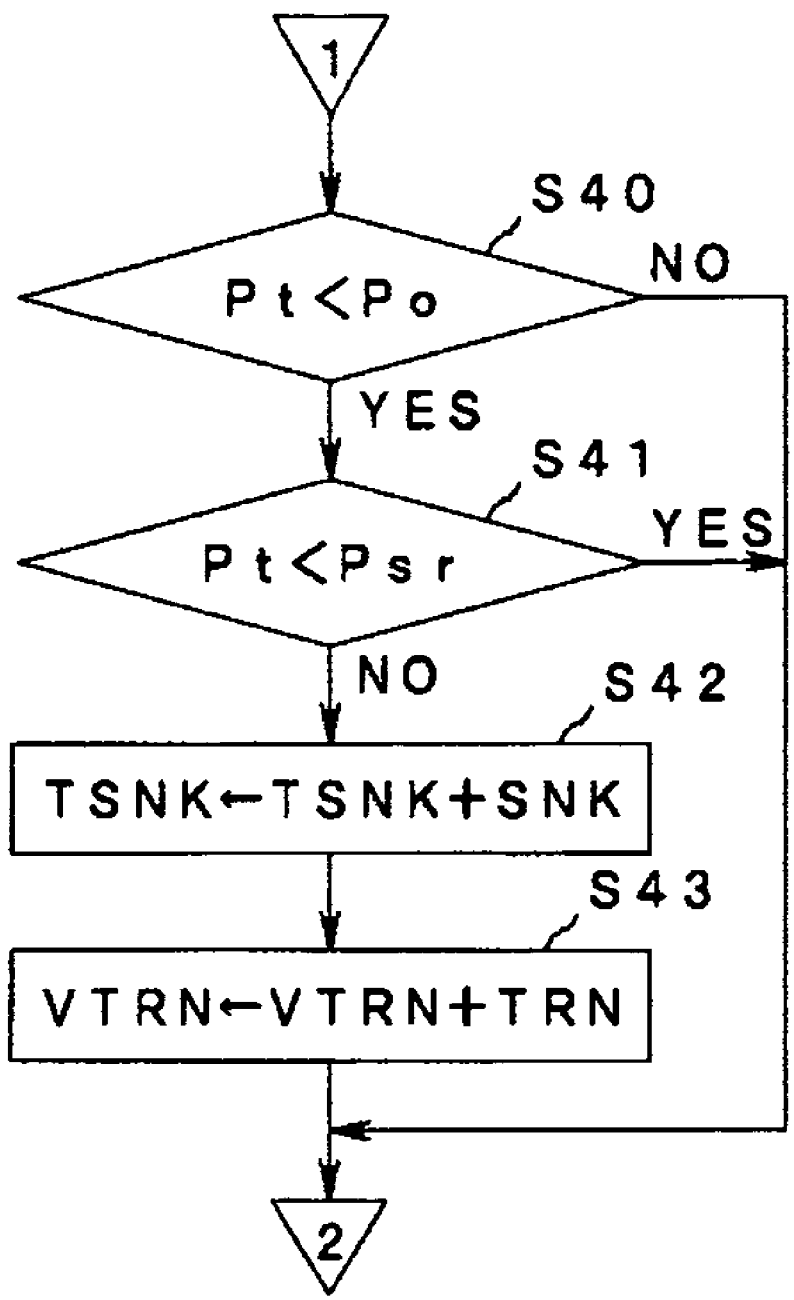
FIG. 8 is a second flowchart showing the pre-surge ignition timing correction amount/VVT correction amount setting routine.

Next, the pre-surge ignition timing correction amount/VVT correction amount setting routine shown in FIGS. 7 and 8 will be described. Note that the processing executed in this routine corresponds to ignition timing and open/close timing correcting means.

This routine is executed at set calculation cycle intervals after the ignition switch 72 has been switched ON. First, in a step S31, a determination is made as to whether or not surging has occurred. The occurrence of surging is determined by comparing a variation width (engine rotation variation width) ΔNe per calculation cycle of the engine rotation speed Ne, which serves as a parameter indicating the combustion variables of the engine, and a preset surge determination threshold (see FIG. 11C). When the engine rotation variation width ΔNe exceeds the surge determination threshold, it is determined that surging has occurred. Note that the surge determination may be performed on the basis of various variables occurring as a result of surging, such as combustion pressure variation.

When it is determined that surging has occurred, the routine is exited. On the other hand, when it is determined that surging has not occurred, the routine advances to a step S32.

When the routine advances to the step S32, a target boost pressure Po, which is set by searching a map or the like on the basis of parameters for detecting the engine operating conditions such as the engine rotation speed Ne and the throttle opening θth, is read in boost pressure control, not shown in the drawings. Note that the processing performed in this step corresponds to target boost pressure setting means.

Next, in a step S33, an actual boost pressure Pt detected by the intake pipe pressure sensor 54 is read, and then, in a step S34, a surge boost pressure Psr is read. The surge boost pressure Psr is determined by searching a table on the basis of the engine rotation speed Ne or from an equation. The ROM 62 stores table data relating to the surge boost pressure Psr at each engine rotation speed Ne, as shown by the broken line in FIG. 12, or a primary expression.

Next, when the routine advances to a step S35, a difference ΔP between the target boost pressure Po and the actual boost pressure Pt is calculated. Next, in a step S36, an absolute value |ΔP| of the difference ΔP is compared to a dead zone determination differential pressure Ps. Note that the processing performed in the steps S35 and S36 corresponds to differential pressure determining means.

When |ΔP|≦Ps, it is determined that the actual boost pressure Pt is in a dead zone region of the target boost pressure Po, and the routine advances to a step S37. When |ΔP|>Ps, it is determined that the actual boost pressure Pt is in a transitional state convergent with the target boost pressure Po, and the routine bifurcates to a step S40.

Figure 12:
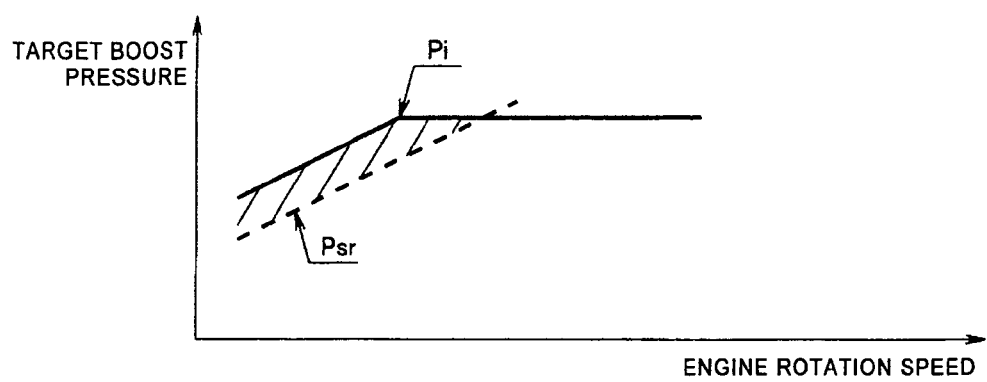
FIG. 12 is a time chart showing a relationship between the engine rotation speed and a target boost pressure when a throttle valve is fully open.

When the routine advances to the step S37, the actual boost pressure Pt is compared to the surge boost pressure Psr, and a determination is made as to whether or not the actual boost pressure Pt is within a surge region (the region indicated by the shading in FIG. 12). When Pt≦Psr such that the actual boost pressure Pt is outside the surge region, the routine is exited. Accordingly, in this case, the previously set ignition timing surge correction amount TSNK and VVT surge correction amount VTRN are maintained. Note that the processing performed in this step corresponds to surge region determining means.

On the other hand, when Pt>Psr such that the actual boost pressure Pt is within the surge region, the routine advances to a step S38. In the step S38, the VVT surge correction amount VTRN is corrected in the retardation direction by subtracting the VVT advancement correction amount TRN from the VVT surge correction amount VTRN (VTRN←VTRN−TRN), whereupon the routine is exited. The VVT surge correction amount VTRN is read when calculating the control current value IVT in Equation (2) above. As a result, the control current value IVT is retarded by the VVT advancement correction amount TRN, whereby the open/close timing of the intake valve 30 is retarded.

Next, the routine advances to a step S39, where the ignition timing surge correction amount TSNK is corrected in the advancement direction by subtracting the ignition timing correction amount SNK from the current ignition timing surge correction amount TSNK (TSNK←TSNK−SNK). The ignition timing surge correction amount TSNK is read when calculating the ignition timing retardation correction amount TTRNK in Equation (1) above, and therefore the ignition timing retardation correction amount TTRNK is advanced by the ignition timing correction amount SNK. Accordingly, the final ignition timing ADVS is advanced by the ignition timing correction amount SNK. Note that the ignition timing correction amount SNK is a fixed value.

When the final ignition timing ADVS is corrected in the retardation direction in this manner to avoid knocking such that the actual boost pressure Pt enters the surge region, although surging has not yet occurred, the open/close timing of the intake valve 30 is moved in the retardation direction by the intake VVT mechanism 32, thereby reducing the intake actual compression ratio (compression ratio) and the volumetric efficiency. Meanwhile, the final ignition timing ADVS is advanced, and therefore surging can be forestalled, combustion variation can be minimized, and a favorable engine output can be obtained.

On the other hand, when the routine bifurcates to the step S40 from the step S36, the actual boost pressure Pt is compared to the target boost pressure Po. When Pt<Po, or in other words when Pt+ΔP<Po, the routine advances to a step S41, and when Pt+ΔP≧Po, the routine is exited.

When the routine advances to the step S41, the actual boost pressure Pt is compared to the surge boost pressure Psr, and a determination is made as to whether or not the actual boost pressure Pt is in the surge region (the region indicated by the shading in FIG. 12). When Pt>Psr such that the actual boost pressure Pt is within the surge region, the routine is exited. Accordingly, in this case, the previously set ignition timing surge correction amount TSNK and VVT surge correction amount VTRN are maintained. Note that in this case, when the actual boost pressure Pt is in the vicinity of the intercept point Pi (see FIG. 12) at which a particularly large surge occurs, the open/close timing of the intake valve 30 may be retarded and the ignition timing may be advanced. By performing this control, a small surge is permitted in the vicinity of the intercept point Pi, but since the control is performed independently of the boost pressure of the exhaust turbo-supercharger 17, favorable power performance and supercharging response can be obtained. More specifically, the ignition timing correction amount SNK is subtracted from the current ignition timing surge correction amount TSNK, and the result is set as a new ignition timing surge correction amount TSNK (TSNK←TSNK−SNK).

Then, with this ignition timing surge correction amount TSNK, the open/close timing of the intake valve 30 may be advanced by advancing the ignition timing retardation correction amount TTRNK by the ignition timing correction amount SNK, subtracting the VVT advancement correction amount TRN from the VVT surge correction amount VTRN, and setting the result as a new VVT surge correction amount VTRN (VTRN←VTRN−TRN).

On the other hand, when Pt≦Psr such that the actual boost pressure Pt is outside the surge region, the routine advances to a step S42. When the routine advances to the step S42, the ignition timing surge correction amount TSNK is corrected in the retardation direction by adding the ignition timing correction amount SNK to the current ignition timing surge correction amount TSNK (TSNK←TSNK+SNK). The ignition timing surge correction amount TSNK is read when calculating the ignition timing retardation correction amount TTRNK in Equation (1) above, and therefore the ignition timing retardation correction amount TTRNK is set in the retardation direction by the ignition timing correction amount SNK. Accordingly, the final ignition timing ADVS is retarded by the ignition timing correction amount SNK.

Next, the routine advances to a step S43, where the VVT surge correction amount VTRN is corrected in the advancement direction by adding the VVT advancement correction amount TRN to the VVT surge correction amount VTRN (VTRN←VTRN+TRN). The routine is then exited. The VVT surge correction amount VTRN is read when calculating the control current value IVT in Equation (2) above, and therefore the control current value IVT is advanced by the VVT advancement correction amount TRN, and the open/close timing of the intake valve 30 is advanced correspondingly.

When the final ignition timing ADVS is corrected in the retardation direction to avoid knocking such that the actual boost pressure Pt is lower than the target boost pressure Po and not in the surge region, and therefore surging has not yet occurred, the open/close timing of the intake valve 30 is advanced by the intake VVT mechanism 32 and the ignition timing is retarded. Hence, the volumetric efficiency increases and the amount of internal EGR increases, enabling improvements in power performance and supercharging response.

In other words, the final ignition timing ADVS is corrected in the retardation direction to avoid knocking, but in order to improve the supercharging response without sacrificing boost pressure control of the exhaust turbo-supercharger 17, the final ignition timing ADVS is preferably retarded further while permitting a small amount of surging, thereby avoiding knocking, and the internal EGR amount is preferably increased by advancing the open/close timing of the intake valve 30.

Note that when the final ignition timing ADVS is retarded on the basis of the ignition timing surge correction amount TSNK set in the step S42 and the open/close timing of the intake valve 30 is advanced by operating the intake VVT mechanism 32 on the basis of the VVT surge correction amount VTRN set in the step S43 such that the actual boost pressure Pt approaches the target boost pressure Po and enters the surge region, the routine advances to the step S38, where the ignition timing surge correction amount TSNK is corrected in the advancement direction. As a result, the final ignition timing ADVS is advanced, and in the step S39 the VVT surge correction amount VTRN is corrected in the retardation direction such that the open/close timing of the intake valve 30 is retarded by the intake VVT mechanism 32. Accordingly, the intake actual compression ratio decreases, leading to a reduction in volumetric efficiency, and as a result, surging is suppressed.

Figure 9:
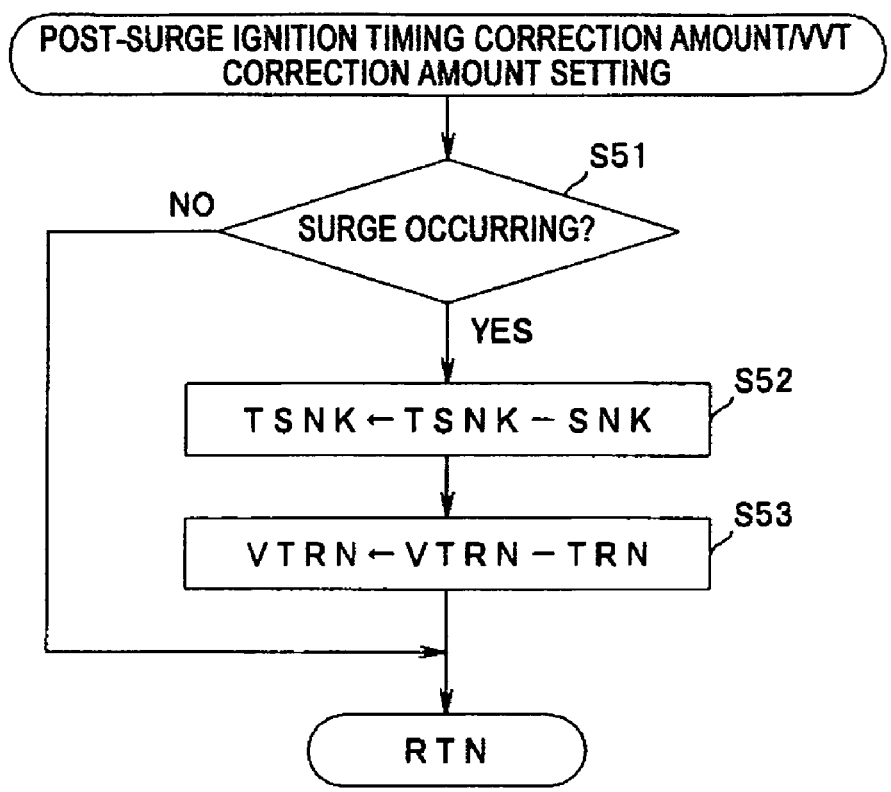
FIG. 9 is a flowchart showing a post-surge ignition timing correction amount/VVT correction amount setting routine.

Next, the post-surge ignition timing correction amount/VVT correction amount setting routine shown in FIG. 9 will be described. Note that the processing executed in this routine corresponds to the ignition timing and open/close timing correcting means. This routine is executed at set calculation cycle intervals after the ignition switch 72 has been switched ON.

First, in a step S51, a determination is made as to whether or not surging has occurred using a similar method to that of the step S31 described above. When it is determined that surging has occurred, the routine advances to a step S52. When it is determined that surging has not occurred, the routine is exited.

When the routine advances to the step S52, the ignition timing surge correction amount TSNK is corrected in the advancement direction by subtracting the ignition timing correction amount SNK from the current ignition timing surge correction amount TSNK (TSNK←TSNK−SNK). The ignition timing surge correction amount TSNK is read when calculating the ignition timing retardation correction amount TTRNK in the Equation (1) above, and therefore the final ignition timing ADVS is advanced by the ignition timing surge correction amount TSNK.

Next, the routine advances to a step S53, where the VVT surge correction amount VTRN is corrected in the retardation direction by subtracting the VVT advancement correction amount TRN from the VVT surge correction amount VTRN (VTRN←VTRN−TRN). The routine is then exited. The VVT surge correction amount VTRN is read when calculating the control current value IVT in Equation (2) above. Accordingly, the control current value IVT is reduced by the VVT advancement correction amount TRN such that the open/close timing of the intake valve 30 is retarded.

Hence, when surging is detected, the open/close timing of the intake valve 30 is moved in the retardation direction by the intake VVT mechanism 32, thereby reducing the intake actual compression ratio (compression ratio) and the volumetric efficiency. Meanwhile, the final ignition timing ADVS is advanced, and therefore the occurrence of surging can be suppressed immediately.

When surging occurs as a result of correcting the final ignition timing ADVS in the retardation direction in order to avoid knocking, the surging is suppressed by retarding the open/close timing of the intake valve 30 immediately using the intake VVT mechanism 32 and advancing the ignition timing. Thus, surging can be suppressed without reducing the boost pressure. Surging is also suppressed by reducing the boost pressure, and therefore improvements in power performance and supercharging response can be achieved.

Note that when surging cannot be suppressed even through integrated control of the ignition timing and VVT mechanism such as that described above, surging may be suppressed by reducing the target boost pressure Po and increasing the fuel injection amount and so on to enrich the air-fuel ratio. In this case, boost pressure control and air-fuel ratio control are performed during the integrated control of the ignition timing and VVT mechanism, and therefore, in comparison with a case in which boost pressure control and air-fuel ratio control are performed independently, the reduction width of the boost pressure and the enrichment width of the air-fuel ratio can be reduced such that deterioration of the exhaust gas and fuel economy can be prevented.

In an engine comprising an exhaust VVT mechanism in addition to the intake VVT mechanism 32, further measures can be taken against surging by modifying the amount by which the open/close timing of the exhaust valve 31 is advanced using the exhaust VVT mechanism when the open/close timing of the intake valve 30 is retarded using the intake VVT mechanism 32 such that even if the volumetric efficiency decreases slightly as a result, the exhaust tuning and exhaust interference can be varied and the combustion condition can be varied in a favorable direction (by advancing the ignition timing and so on).

Figure 11:
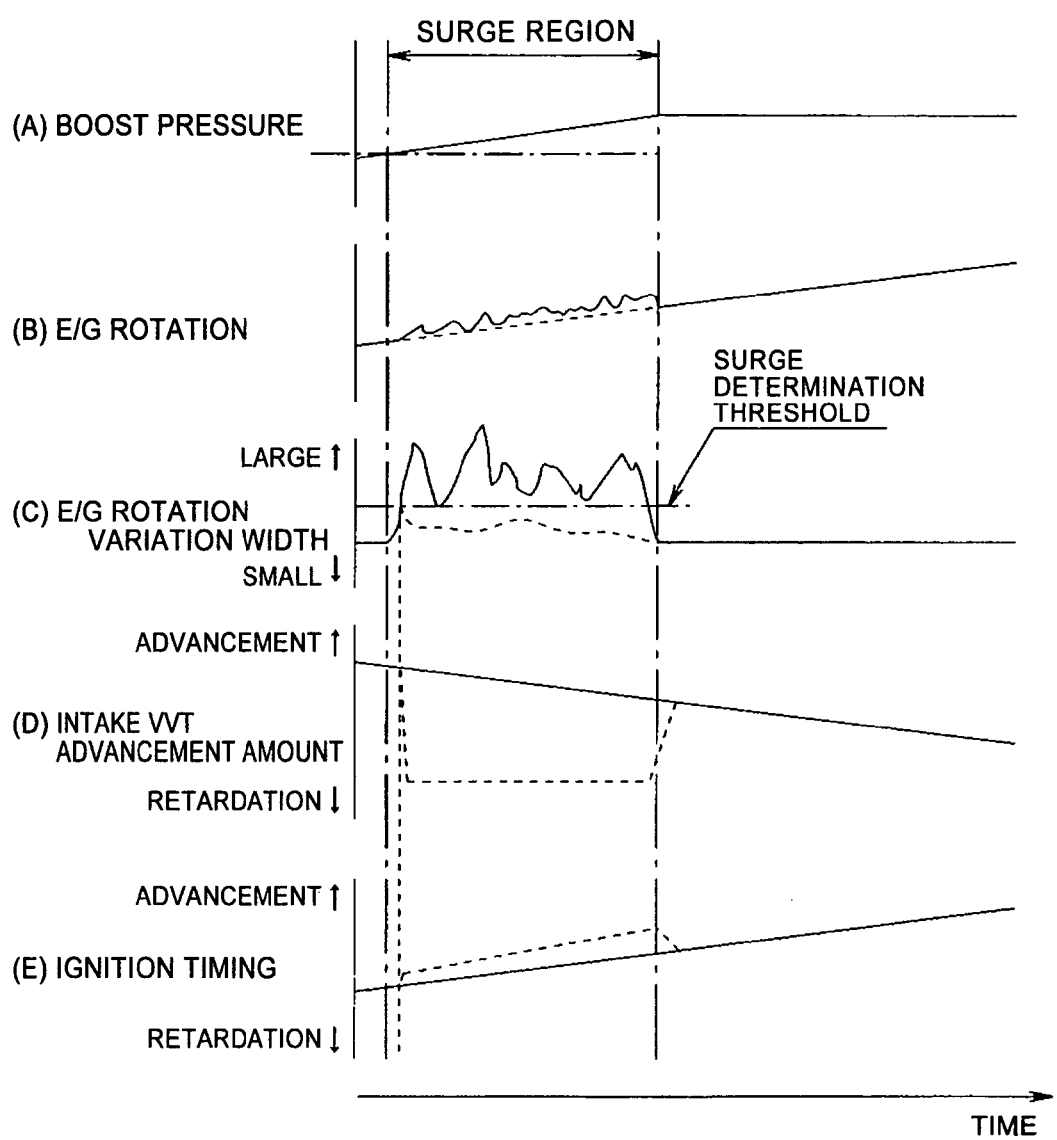
FIG. 11A is a time chart showing a relationship between a boost pressure of a supercharger and a surge region.
FIG. 11B is a time chart showing variation in an engine rotation speed in the surge region.
FIG. 11C is a time chart showing an engine rotation variation width in the surge region.
FIG. 11D is a time chart showing an advancement amount of an intake valve by the intake VVT mechanism in the surge region.
FIG. 11E is a time chart showing an ignition timing in the surge region.

Next, an example of the intake VVT control and ignition timing control that are executed by the ECU 60 will be described with reference to the timing charts shown in FIG. 11.

First, conventional intake VVT control and ignition timing control will be described. As shown by the solid lines in the drawing, the boost pressure (actual boost pressure) Pt of the exhaust turbo-supercharger 17 rises as the engine rotation speed Ne increases, and even when the boost pressure enters the surge region, the open/close timing of the intake valve 30 is gradually retarded by the intake VVT mechanism 32 and the ignition timing is gradually advanced until knocking is detected, as shown in FIGS. 11D and 11E. Therefore, as shown in FIGS. 11B and 11C, the engine rotation speed Ne varies within the surge region, causing surging to occur.

In this embodiment, on the other hand, the open/close timing of the intake valve 30 is retarded by the intake VVT mechanism 32 when the boost pressure (actual boost pressure) Pt of the exhaust turbo-supercharger 17 reaches the surge determination threshold, as shown by the broken lines in the drawing, and as a result, the intake actual compression ratio (compression ratio) decreases such that surging can be avoided or suppressed. Moreover, the ignition timing is advanced, enabling an improvement in combustion.

As described above, in this embodiment surging is avoided by performing control of the open/close timing of the intake valve 30 using the intake VVT mechanism 32 and control of the ignition timing independently of the boost pressure of the exhaust turbo-supercharger 17, and therefore, the boost pressure can be increased relatively and a further improvement in power performance can be achieved. Furthermore, surging can be avoided or suppressed without enriching the air-fuel ratio, and therefore an improvement in fuel economy can be realized.

Note that the present invention is not limited to the embodiment described above. For example, the supercharger is not limited to the exhaust turbo-supercharger 17, and may be a motorized supercharger or a mechanical supercharger driven by an output shaft of an engine or the like. Further, the control of the present invention is performed independently of supercharger control, and therefore the present invention may be applied to a natural intake-type engine.

What is claimed is:

1. A control device for an engine having a variable valve timing mechanism that varies an open/close timing of an intake valve, comprising:

surge determining means for determining the occurrence of surging on the basis of a parameter indicating a combustion variable of said engine;

ignition timing control means for setting an ignition timing on the basis of an engine operating condition; and ignition timing and open/close timing correcting means for correcting said open/close timing of said intake valve in a retardation direction using said variable valve timing mechanism and correcting said ignition timing in an advancement direction using said ignition timing control means when said surge determining means determine that surging has occurred.

2. The control device for an engine according to claim 1, wherein said parameter indicating a combustion variable of said engine is an engine rotation variation width per calculation cycle, and said surge determining means determine that surging has occurred when said engine rotation variation width exceeds a preset surge determination threshold.

3. A control device for an engine having a variable valve timing mechanism that varies an open/close timing of an intake valve, and a supercharger, comprising:

ignition timing control means for setting an ignition timing on the basis of an engine operating condition;

surge region determining means for determining whether or not a boost pressure of said supercharger is within a preset surge region; and ignition timing and open/close timing correcting means for correcting said open/close timing of said intake valve in a retardation direction using said variable valve timing mechanism and correcting said ignition timing in an advancement direction using said ignition timing control means when said surge region determining means determine that said boost pressure is within said surge region.

4. The control device for an engine according to claim 3, further comprising:

target boost pressure setting means for setting a target boost pressure on the basis of said engine operating condition;

boost pressure detecting means for detecting an actual boost pressure; and differential pressure determining means for determining whether or not a differential pressure calculated from a difference between said target boost pressure and said actual boost pressure is equal to or lower than a preset set differential pressure, wherein said ignition timing and open/close timing correcting means correct said open/close timing of said intake valve in said advancement direction using said variable valve timing mechanism and correct said ignition timing in said retardation direction using said ignition timing control means when said differential pressure determining means determine that said differential pressure is equal to or lower than said set differential pressure and said surge region determining means determine that said actual boost pressure is outside said surge region.

* * * * *